United States Patent
Kawamoto et al.

(10) Patent No.: US 10,011,695 B2
(45) Date of Patent: Jul. 3, 2018

(54) PREPREG

(71) Applicant: TORAY INDUSTRIES, INC., Tokyo (JP)

(72) Inventors: Shiori Kawamoto, Ehime (JP); Ichiro Taketa, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/540,424

(22) PCT Filed: Dec. 25, 2015

(86) PCT No.: PCT/JP2015/086156
§ 371 (c)(1),
(2) Date: Jun. 28, 2017

(87) PCT Pub. No.: WO2016/111190
PCT Pub. Date: Jul. 14, 2016

(65) Prior Publication Data
US 2018/0002504 A1 Jan. 4, 2018

(30) Foreign Application Priority Data
Jan. 7, 2015 (JP) .................. 2015-001281

(51) Int. Cl.
C08J 5/24 (2006.01)
C08J 5/04 (2006.01)
B32B 27/14 (2006.01)
B32B 27/18 (2006.01)

(52) U.S. Cl.
CPC .................. *C08J 5/24* (2013.01); *B32B 27/14* (2013.01); *B32B 27/18* (2013.01); *C08J 5/042* (2013.01);
(Continued)

(58) Field of Classification Search
CPC ........................................................ C08J 5/24
(Continued)

(56) References Cited

U.S. PATENT DOCUMENTS 8,758,874 B2 * 6/2014 Taketa ................. B29C 43/222
428/113
2013/0122241 A1 5/2013 Wadahara et al.
(Continued)

FOREIGN PATENT DOCUMENTS

JP 01104624 A 4/1989
JP 2007217665 A 8/2007
(Continued)

OTHER PUBLICATIONS

International Search Report and Written Opinion for International Application No. PCT/JP2015/086156, dated Mar. 15, 2016—5 pages.
(Continued)

*Primary Examiner* — Brent T O'Hern
(74) *Attorney, Agent, or Firm* — RatnerPrestia

(57) ABSTRACT

Provided is a prepreg including: a fiber layer containing unidirectionally arranged carbon fibers impregnated with a first thermosetting resin; and a resin layer disposed on at least one side of the fiber layer and containing a second thermosetting resin and a thermoplastic resin that is insoluble in the second thermosetting resin. The prepreg is configured such that the areal weight of fibers and the weight fraction of resin in the prepreg are 120 to 300 g/m² and 25 to 50 mass %, respectively, and in the case where a plurality of prepregs are laid up, and the coefficient of interlayer friction is measured every 10° C. in a temperature range of 40 to 100° C. at a pull-out speed of 0.2 mm/min under a perpendicular stress of 0.8 bar, the temperature at which the coefficient of interlayer friction is 0.02 or less is present within a temperature range of 40 to 100° C. The prepreg
(Continued)

exhibits high impact strength when formed into a fiber-reinforced plastic suitable for an aircraft structural member, and the prepreg also has excellent drapeability when a prepreg laminate is made to conform to a three dimensional shape.

13 Claims, 2 Drawing Sheets

(52) U.S. Cl.
CPC ..... *B32B 2262/106* (2013.01); *C08J 2377/02* (2013.01); *C08J 2463/00* (2013.01)

(58) Field of Classification Search
USPC ........................................................ 428/105
See application file for complete search history.

(56) References Cited

U.S. PATENT DOCUMENTS

2013/0281573 A1  10/2013  Goto et al.
2014/0087178 A1   3/2014  Arai et al.

FOREIGN PATENT DOCUMENTS

| | | |
|---|---|---|
| JP | 2008006814 A | 1/2008 |
| JP | 2008230236 A | 10/2008 |
| JP | 2010018724 A | 1/2010 |
| WO | 9606725 A1 | 3/1996 |
| WO | 9961233 A2 | 12/1999 |
| WO | 2008038591 A1 | 4/2008 |
| WO | 2014157013 A1 | 2/2017 |

OTHER PUBLICATIONS

Extended European Search Report for European Application No. 15877063.6, dated Nov. 15, 2017, 8 pages.

Larberg et al., "On the interply friction of different generations of carbon/epoxy prepeg sytems," Royal Institute of Technology, KTH, Dept. of Vehicle and Aeronautical Engineering, Teknikringen 8, SE-100 44 Stockholm, Sweden, pp. 1067-1074, Composites: Part A 42 (2011).

* cited by examiner a)

b)

PREPREG

CROSS REFERENCE TO RELATED APPLICATIONS

This is the U.S. National Phase application of PCT/JP2015/086156, filed Dec. 25, 2015, which claims priority to Japanese Patent Application No. 2015-001281, filed Jan. 7, 2015, the disclosures of these applications being incorporated herein by reference in their entireties for all purposes.

FIELD OF THE INVENTION

The present invention relates to a carbon-fiber-reinforced prepreg for obtaining a fiber-reinforced plastic.

BACKGROUND OF THE INVENTION

Carbon-fiber-reinforced plastics have excellent specific strength and specific rigidity and thus are useful. Their applications have been widely expanded to aircraft structural members, wind mill blades, and automobile outer panels, as well as computer applications including IC trays, laptop computer housings, and the like, and the demand is increasing year by year. In particular, carbon-fiber-reinforced plastics are light in weight and have excellent strength and stiffness, and thus have been widely used in the aircraft industry, as typified by commercial aircrafts. In recent years, they are also used for large-sized structural members, such as main wings and bodies.

For such a structural member, a cured prepreg laminate, which has particularly excellent dynamic characteristics among fiber-reinforced plastics, is often used. In a fiber-reinforced plastic composed of laid-up prepregs, fibers are unidirectionally aligned, and the fiber volume content is improved, whereby the high fiber elastic modulus and strength of carbon fibers can be best utilized. In addition, when the prepregs are impregnated with a high-performance resin while reducing variation in areal weight, the obtained fiber-reinforced plastic has stable quality. As a weak point of such a fiber-reinforced plastic composed of laid-up prepregs, there has been a problem in that even when interlayer cracking has occurred in the prepregs upon the impact of a foreign substance from out of the plane, and there is delamination inside, the presence of damage cannot be seen from the outside. The presence of delamination leads to a decrease in the compression strength of the structural member. Therefore, for the purpose of ensuring safety during aircraft flight, compressive strength after impact, which is called CAI, has been used as a structural design index. Then, according to Patent Document 1, a thermoplastic resin is formed into fine particles and localized on the surface of a prepreg. As a result, when such prepregs are laid up to form a fiber-reinforced plastic, the thermoplastic resin is accumulated between layers, thereby enhancing the delamination strength. Accordingly, the area of delamination upon the application of out-of-plane impact is reduced, whereby CAI is successfully improved. Currently, such "increased-interlayer-toughness" prepregs have been mainly applied to fiber-reinforced plastics used for primary structural members of aircrafts.

It is known that of the steps for producing a structural member, the shaping step, in which prepregs are made conform to a three dimensional shape and formed into a preform before the forming/curing step using an autoclave or the like, is an important step that influences the success or failure in material quality. When prepregs are shaped layer by layer, a high-quality preform can be obtained, but such a process is high cost and also takes a long period of time. Then, in order to enhance the production efficiency, a shaping method called hot-forming, in which prepregs are previously laid up in planar form into a prepreg laminate at high speed using an automatic machine, and then the prepreg laminate is shaped into a three dimensional shape while applying heat thereto, is used. Patent Document 2 discloses a shaping method in which a prepreg laminate is disposed between a mandrel and an expandable bladder, and the bladder is expanded, thereby pressing the laminate against the mandrel while bending the same.

PRIOR ART DOCUMENTS

Patent Documents

Patent Document 1: Japanese Patent Laid-open Publication No. 1-104624

Patent Document 2: WO 96/06725

BRIEF SUMMARY OF THE INVENTION

According to the shaping method of Patent Document 2 described above, together with the bending deformation of each layer of the prepreg laminate, interlayer slippage occurs, whereby the laminate conforms to the shape. However, there has been a problem in that the bending of each layer occurs prior to interlayer slippage, and thus wrinkling is likely to occur. When the preform has wrinkles, such defects are taken over to the formed member, resulting in a decrease in structural strength as a member, which leads to unstable quality.

Thus, in the light of the problems of prior art, an object of the invention is to provide a prepreg that exhibits high impact strength when formed into a fiber-reinforced plastic suitable for an aircraft structural member, the prepreg having excellent drapeability when a prepreg laminate is made conform to a three dimensional shape:

The present invention is configured as follows. That is, provided is a prepreg including: a fiber layer containing unidirectionally arranged carbon fibers impregnated with a thermosetting resin 1; and a resin layer disposed on at least one side of the fiber layer and containing a thermosetting resin 2 and a thermoplastic resin that is insoluble in the thermosetting resin 2. The prepreg is configured such that the areal weight of fibers and the weight fraction of resin in the prepreg are 120 to 300 $g/m^2$ and 25 to 50 mass %, respectively, and in the case where a plurality of prepregs are laid up, and the coefficient of interlayer friction is measured every 10° C. in a temperature range of 40 to 100° C. at a pull-out speed of 0.2 mm/min under a perpendicular stress of 0.8 bar, the temperature at which the coefficient of interlayer friction is 0.02 or less is present within a temperature range of 40 to 100° C.

According to the present invention, it is possible to obtain a prepreg which is capable of producing a wrinkle-free preform without using a device having a special mechanism in a hot-forming shaping step having excellent productivity where a planar prepreg laminate is directly made conform to a three dimensional shape, and which also exhibits high impact strength when formed into a fiber-reinforced plastic.

DETAILED DESCRIPTION OF CERTAIN EMBODIMENTS OF THE INVENTION

Figure 1:
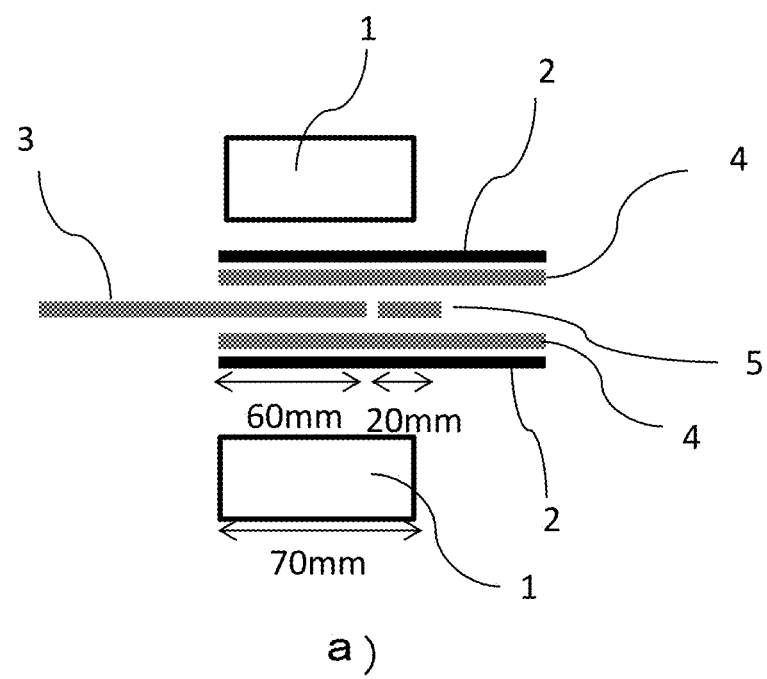
FIG. 1$a$) is a cross-sectional view showing the measurement method for a coefficient of interlayer friction of the present invention, and FIG. 1b) is a plan view showing the measurement method for a coefficient of interlayer friction of the present invention.
Figure 1:
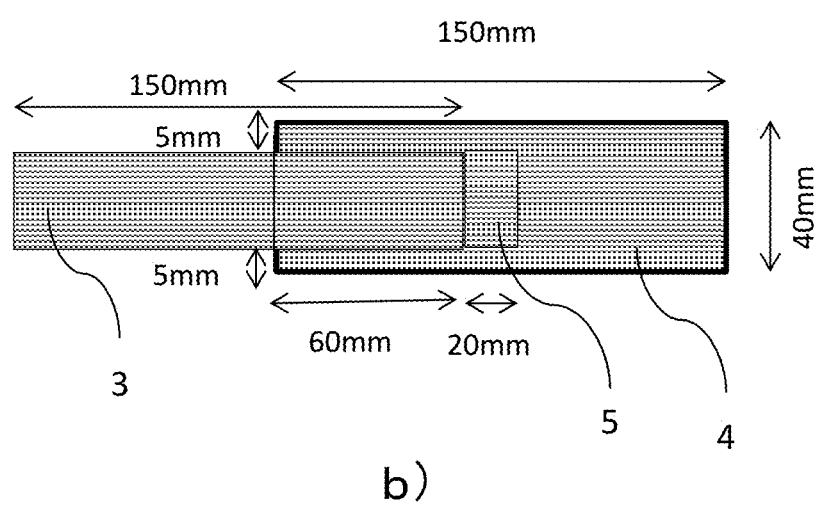

The present inventors have conducted research for the purpose of improving the resistance to an out-of-plane impact load in a fiber-reinforced plastic obtained from a prepreg laminate. As described above, by accumulating a thermoplastic resin between the layers of a prepreg laminate, the impact strength can be improved. However, it has been found that the thermoplastic resin between layers hinders the prepreg interlayer slippage, resulting in a decrease in drapeability. Accordingly, they have found that the object of the present invention described above can be solved when a prepreg is configured such that a fiber layer containing carbon fibers and a thermosetting resin 1 and a resin layer containing a thermosetting resin 2 and a thermoplastic resin insoluble in the thermosetting resin 2 are laid up, and is also designed such that, when in the form of a prepreg laminate, the interlayer friction resistance, which restricts the slippage between prepreg layers, is reduced. As a result, when the prepreg laminate is made conform to a three dimensional shape, the bending deformation of each layer of the prepreg laminate and interlayer slippage are caused in a well-balanced manner, whereby wrinkling is suppressed. They have found that a fiber-reinforced plastic having high interlayer toughness, high dynamic characteristics, and less variation in quality can thus be obtained.

Specifically, provided is a prepreg including: a fiber layer containing unidirectionally arranged carbon fibers impregnated with a thermosetting resin 1; and a resin layer disposed on at least one side of the fiber layer and containing a thermosetting resin 2 and a thermoplastic resin that is insoluble in the thermosetting resin 2. The prepreg is configured such that the areal weight of fibers and the weight fraction of resin in the prepreg are 120 to 300 g/m$^2$ and 25 to 50 mass %, respectively, and in the case where a plurality of prepregs are laid up, and the coefficient of interlayer friction is measured every 10° C. in a temperature range of 40 to 100° C. at a pull-out speed of 0.2 mm/min under a perpendicular stress of 0.8 bar, the temperature at which the coefficient of interlayer friction is 0.02 or less is present within a temperature range of 40 to 100° C. The details of the coefficient of interlayer friction will be described below.

In the present invention, the thermosetting resin is not particularly limited, and should be a resin that undergoes a cross-linking reaction with heat to form an at least partial three-dimensional cross-linked structure. Examples of these thermosetting resins include an unsaturated polyester resin, a vinyl ester resin, an epoxy resin, a benzoxazine resin, a phenol resin, a urea resin, a melamine resin, and a polyimide resin. Modified products of these resins and blends of two or more kinds of resins are also usable. In addition, these thermosetting resins may be resins that are self-curable with heat, and it is also possible to blend such a resin with a hardener, an accelerator, or the like.

Among these thermosetting resins, epoxy resins are preferably used for their excellent balance of heat resistance, dynamic characteristics, and adhesion to carbon fibers. It is particularly preferable to use an epoxy resin whose precursor is a compound having amine, phenol, and a carbon-carbon double bond. Specifically, it is preferable to use an aminophenol type epoxy resin, a glycidyl aniline type epoxy resin, and a tetra glycidyl amine type epoxy resin, whose precursors are amines. As glycidyl amine type epoxy resins, modifications such as tetraglycidyl diaminodiphenyl, triglycidyl-p-aminophenol, triglycidyl aminocreosol, and the like can be mentioned. A tetra glycidyl amine type epoxy resin having an average epoxide equivalent weight (EEW) within a range of 100 to 115, which is a high-purity tetra glycidyl amine type epoxy resin, and an aminophenol type epoxy resin having an average EEW within a range of 90 to 104, which is a high-purity aminophenol type epoxy resin, are preferably used because they suppress volatile matters that may form voids in the obtained fiber-reinforced plastic. Tetraglycidyldiaminodiphenylmethane has excellent heat resistance and is preferably used as a resin for a composite material for a structural member of an aircraft.

In addition, a glycidyl ether type epoxy resin using phenol as a precursor is also preferably used as a thermosetting resin. Examples of such epoxy resins include a bisphenol-A type epoxy resin, a bisphenol-F type epoxy resin, a bisphenol-S type epoxy resin, a phenol novolac type epoxy resin, a creosol novolac type epoxy resin, and a resorcinol type epoxy resin. A bisphenol-A type epoxy resin having an average EEW within a range of 170 to 180, which is a high-purity bisphenol-A type epoxy resin, and a bisphenol-F type epoxy resin having an average EEW within a range of 150 to 65, which is a high-purity bisphenol-F type epoxy resin, are preferably used because they suppress volatile matters that may form voids in the obtained fiber-reinforced plastic.

A bisphenol-A type epoxy resin, a bisphenol-F type epoxy resin, and a resorcinol type epoxy resin, which are liquid, have low viscosity and thus are preferably used in combination with other epoxy resins.

In addition, as compared with a bisphenol-A type epoxy resin that is liquid at room temperature (about 25° C.), a bisphenol-A type epoxy resin that is solid at room temperature (about 25° C.) has a lower cross-linking density in the cured resin, and thus the heat resistance of the cured resin is lower, but the toughness is higher. Accordingly, such a resin is preferably used in combination with a glycidyl amine type epoxy resin or a liquid bisphenol-A type epoxy resin or bisphenol-F type epoxy resin.

An epoxy resin having a naphthalene skeleton forms a cured resin having low absorbency and high heat resistance. In addition, a biphenyl type epoxy resin, a dicyclopentadiene type epoxy resin, a phenol aralkyl type epoxy resin, and a phenyl fluorine type epoxy resin also form cured resins having low absorbency, and thus can be preferably used.

A urethane modified epoxy resin and an isocyanate modified epoxy resin form cured resins having high fracture toughness and elongation, and thus can be preferably used.

These epoxy resins may be used alone, or may also be suitably blended and used. When an epoxy resin having a bifunctional, trifunctional, or higher-functional group is added to a resin composition, the resulting prepreg can satisfy both workability/processability and heat resistant under wetting conditions as a fiber-reinforced complex; therefore, this is preferable. In particular, a combination of a glycidyl amine type epoxy resin and a glycidyl ether type epoxy resin can achieve processability, heat resistance, and water resistance. In addition, blending at least one epoxy resin that is liquid at room temperature with at least one epoxy resin that is solid at room temperature is effective in imparting both preferred tackiness properties and draping properties to the prepreg.

A phenol novolac type epoxy resin and a creosol novolac type epoxy resin have high heat resistance and low absorbency, and thus form cured resins having high heat and water resistance. By using such a phenol novolac type epoxy resin and a creosol novolac type epoxy resin, the tackiness properties and draping properties of the prepreg can be adjusted while enhancing the heat and water resistance.

A curing agent for the epoxy resin may be any compound having an active group that is capable of reacting with an epoxy group. A compound having an amino group, an acid anhydride group, or an azido group is preferable as a curing agent. More specific examples of curing agents include various isomers of dicyandiamide, diaminodiphenylmethane, and diaminodiphenyl sulfone, amino benzoic acid esters, various acid anhydrides, phenol novolac resins, cresol novolac resins, polyphenols, imidazole derivatives, aliphatic amines, tetramethylguanidine, thiourea added amines, methyl hexahydrophthalic acid anhydrides, other carboxylic acid anhydrides, carboxylic acid hydrazides, carboxylic acid amides, polymercaptans, boron trifluoride-ethylamine complexes, and other Lewis acid complexes. These curing agents may be used alone or in combination.

By using an aromatic diamine as a curing agent, a cured resin having excellent heat resistance can be obtained. In particular, various isomers of diaminodiphenyl sulfone form cured resins having excellent heat resistance, and thus are the most preferable. It is preferable that the amount of aromatic diamine curing agent added is a stoichiometrically equivalent amount. However, in some cases, the amount used is about 0.7 to 0.9 equivalents of the epoxy resin, whereby a cured resin having a high elastic modulus can be obtained.

In addition, by using a combination of imidazole or dicyandiamide with a urea compound (e.g., 3-phenol-1,1-dimethylurea, 3-(3-chlorophenyl)-1,1-dimethylurea, 3-(3,4-dichlorophenyl)-1,1-dimethylurea, 2,4-toluene bisdimethylurea, or 2,6-toluene bisdimethylurea) as a curing agent, whereas curing occurs at a relatively low temperature, high heat resistance and water resistance can be achieved. In the case where an acid anhydride is used as a curing agent, as compared with the case of using an amine compound, a cured resin having relatively lower absorbency is obtained. Further, by using a substance that may form one of these curing agents, such as a microencapsulation substance, the preservation stability of the prepreg can be enhanced. In particular, the tackiness properties and draping properties are less likely to change even when the prepreg is allowed to stand at room temperature.

In addition, a product resulting from the partial preliminary reaction of the epoxy resin or the curing agent, or alternatively both of them, may also be added to the composition. In some cases, this method is effective in viscosity adjustment or preservation stability improvement.

With respect to the thermosetting resin, it is also possible that a thermoplastic resin is blended with and dissolved in the thermosetting resin. It is usually preferable that such a thermoplastic resin is thermoplastic resin having a bond selected from a carbon-carbon bond, an amide bond, an imide bond, an ester bond, an ether bond, a carbonate bond, a urethane bond, a thioether bond, a sulfone bond, and a carbonyl bond, but the resin may also partially have a cross-linked structure.

In addition, it is also possible that the thermoplastic resin has or does not have crystallinity. In particular, it is preferable that at least one kind of resin selected from the group consisting of polyamides, polycarbonates, polyacetals, polyphenyleneoxides, polyphenylenesulfides, polyarylates, polyesters, polyamideimides, polyimides, polyetherimides, polyimides having a phenyl trimethylindan structure, polysulfones, polyethersulfones, polyetherketones, polyetheretherketones, polyaramides, polyethernitriles, and polybenzimidazoles is blended with and dissolved in the thermosetting resin.

These thermoplastic resins may be commercially available polymers, or may also be so-called oligomers having a molecular weight lower than that of commercially available, polymers. As oligomers, oligomers having a functional group reactive with the thermosetting resin at the terminal or in the molecular chain are preferable.

In the case where a blend of a thermosetting resin and a thermoplastic resin is used, as compared with the case of using only either of them, the brittleness of the thermosetting resin can be covered with the toughness of the thermoplastic resin, while the difficulty in forming of the thermoplastic resin can be covered with the thermosetting resin. As a result, the blend can serve as a well-balanced base compound. In terms of balance, it is preferable that the ratio (part by mass) between the thermosetting resin and the thermoplastic resin is within a range of 100:2 to 100:50, more preferably within a range of 100:5 to 100:35.

The resin layer in the present invention contains a thermoplastic resin insoluble in the thermosetting resin. Here, a thermoplastic resin insoluble in the thermosetting resin means that when the thermoplastic resin is dispersed in a thermosetting resin, heated in an autoclave to 180° C. at a temperature ramp rate of 1.5° C./min, and then heat-pressed and cured at a temperature of 180° C. and a pressure of 7 kg/cm$^2$ for 2 hours, the thermoplastic resin does not dissolve in the thermosetting resin. Here, "not dissolve" means that when the surface of the cured thermosetting resin obtained as above is ground until the thermoplastic resin is exposed to the surface, and the surface is observed using an optical microscope, a clear interface can be observed between the thermosetting resin and the thermoplastic resin. Meanwhile, in the case where there is no clear interface between the thermoplastic resin and the surrounding thermosetting resin, and they cannot be distinguished from each other, the thermoplastic resin was considered to have dissolved in the thermosetting resin.

Here, the kind of thermoplastic resin insoluble in the thermosetting resin is not limited, and a thermoplastic resin having a glass transition temperature within a range of 80° C. to 180° C. is preferable. A thermoplastic resin having such a relatively high glass transition temperature does not undergo deformation during heating and curing. Thus, the resulting fiber-reinforced plastic obtained by curing a prepreg laminate has stable interlayer thickness and also has excellent interlayer toughness. At the same time, compression strength under wet-heat can be stably ensured. In the case where the glass transition temperature is less than 80° C., in the resulting fiber-reinforced plastic, the balance between interlayer toughness and compression strength under wet-heat is insufficient. Meanwhile, in the case where the glass transition temperature is more than 180° C., the toughness of the thermoplastic resin itself tends to be insufficient. At the same time, the interfacial adhesiveness between the thermoplastic resin and the matrix resin becomes insufficient, resulting in a fiber-reinforced plastic having insufficient interlayer toughness.

The thermoplastic resin insoluble in the thermosetting resin may be the same kind as any of the above various thermoplastic resins. Among them, polyamide has excellent toughness and therefore significantly improves the impact resistance, and thus is the most preferable. Among polyamides, Nylon 12, Nylon 6, Nylon 11, Nylon 6/12 copolymers, and a nylon modified to have a semi-IPN (polymer interpenetrating network structure) with an epoxy compound (semi-IPN nylon) described in Example 1 of Japanese Patent Laid-open Publication No. 1-104624 have particularly excellent adhesive strength with a thermosetting resin. Therefore, the delamination strength as a fiber-reinforced plastic is high, and the improving effect on impact resistance is also high. Thus, such polyamides are preferable. The resin layer containing a thermoplastic resin insoluble in the thermosetting resin may be placed on only one side of the prepreg surface or may also be placed on both sides.

As carbon fibers, any type of carbon fibers may be used according to the intended use. However, in terms of interlayer toughness and impact resistance, carbon fibers having a tensile modulus of 230 to 400 GPa are preferable. In addition, in terms of strength, it is preferable to use carbon fibers having a tensile strength of 4.4 to 7.0 GPa because, as a result, a composite material having high stiffness and mechanical strength is obtained. In addition, the tensile strain is also an important factor, and high-strength high-elongation carbon fibers having a tensile strain of 1.7 to 2.3% are preferable. Accordingly, carbon fibers having all the following characteristics are the most suitable: a tensile modulus of at least 230 GPa, a tensile strength of at least 4.4 GPa, and a tensile strain of at least 1.7%.

As commercially available products of preferably used carbon fibers, "TORAYCA®" T1100G-24K, "TORAYCA®" T1100G-12K, "TORAYCA®" T800S-24K, "TORAYCA®" T800S-12K, "TORAYCA®" T300-3K, and "TORAYCA®" T700S-12K (all manufactured by Toray Industries, Inc.) can be mentioned, for example.

The areal weight of fibers in the prepreg of the present invention is 120 to 300 g/m$^2$, still more preferably 140 to 280 g/m$^2$. Here, "areal weight of fibers" is the mass of carbon fibers contained per unit area of the prepreg. In the case where the areal weight of fibers is less than 120 g/m$^2$, a larger number of laid-up layers is required to obtain a fiber-reinforced plastic with a desired thickness, resulting in a problem in that the number of production steps increases. Meanwhile, in the case where the areal weight of fibers is more than 300 g/m$^2$, the resin is difficult to impregnate into fibers. As a result, non-impregnated parts remain as voids in the formed fiber-reinforced plastic, which may lead to the deterioration of physical properties.

In the prepreg of the present invention, the weight fraction of resin relative to the total mass of the prepreg is 25 to 50 mass %, still more preferably 30 to 40 mass %. Here, "weight fraction of rein" is the proportion of the total resin component excluding carbon fibers relative to the total mass of the prepreg. When the weight fraction of resin is more than 50 mass %, the fiber content is reduced. As a result, when the prepreg is formed into a fiber-reinforced plastic, the strength and elastic modulus are low. In addition, when the weight fraction of resin is less than 25 mass %, particularly in the configuration of the present invention where a resin layer is provided on the prepreg surface, the resin amount in the fiber layer is small, making it impossible to completely cover the fiber surface with the resin. As a result, cracking is likely to occur between fibers, whereby unexpected fracture may be caused, or quality variation may also increase.

In the prepreg of the present invention, in the case where a plurality of prepregs are laid up, and the coefficient of interlayer friction is measured every 10° C. in a temperature range of 40 to 100° C. at a pull-out speed of 0.2 mm/min under a perpendicular stress of 0.8 bar, the temperature at which the coefficient of interlayer friction is 0.02 or less is present within a temperature range of 40 to 100° C. In the measurement of the coefficient of interlayer friction, the temperature at which the coefficient of interlayer friction is preferably 0.015 or less, still more preferably 0.01 or less, is present within a temperature range of 40 to 100° C. It is still more preferable that in the measurement of the coefficient of interlayer friction, the temperature at which the coefficient of interlayer friction is within the above range is present within a temperature range of 50° C. to 80° C. In the case where the temperature at which the coefficient of interlayer friction is 0.02 or less is not present within a temperature range of 40 to 100° C., when the prepreg laminate is made conform to a three dimensional shape, even if shaping is performed at a temperature that gives the minimum coefficient of interlayer friction, interlayer slippage is unlikely to occur, resulting in wrinkling.

The coefficient of interlayer friction means, in a prepreg laminate composed of laid-up prepregs, the coefficient of friction that occurs between prepreg layers. In the present invention, the coefficient of interlayer friction is determined as follows. As shown in FIG. 1, one prepreg 3 is sandwiched between two prepregs 4, and, from out of the prepreg plane, a predetermined load is perpendicularly applied to the prepregs using a pressure plate 1. The load obtained when pulling out the sandwiched prepreg 3 is divided by twice the load perpendicularly pressed from out of the prepreg plane (perpendicular load), and the obtained value is taken as the coefficient of interlayer friction. The reason why twice the load is used is that there are two prepreg surfaces that receive the frictional resistance. As the test method, a prepreg is cut into a shape elongated in the fiber direction, and three prepregs, a prepreg 3 and prepregs 4, are laid up to have the same fiber direction such that they overlap in an area having a width of 30 mm (perpendicular to the fiber direction) and a length of 60 mm (fiber direction). A spacer 5 prepared by cutting a 30-mm-wide prepreg having the same fiber direction is installed to contact the overlapping parts of the prepregs 4 at the center. As the prepreg is pulled out, the area of the overlapping parts decreases, and the region pressurized with the pressure plate 1 is biased. As a result, the pressure plate 1 may contact unevenly, whereby a high load is locally applied. For this reason, the spacer 5 is disposed opposite to the pull-out direction, thereby preventing the pressure plate 1 from being inclined. To the overlapping parts and a 10-mm-long area of the spacer (an area having a width of 30 mm and a length of 70 mm), a constant perpendicular load of 168 N is continuously applied throughout the test while controlling the temperature at a predetermined temperature with the pressure plate 1 having a heating source. When converted into a perpendicular stress, the stress is 0.8 bar. After 10 minutes from the start of perpendicular load application to the prepregs, the central prepreg layer 3 is pulled out at a pull-out speed of 0.2 mm/min in the fiber direction, and the pull-out load is measured. The pull-out load is divided by twice the perpendicular load (144 N at the start of the test) applied to the overlapping parts (an area having a width of 30 mm and a length of 60 mm at the start of the test), and taken as the coefficient of interlayer friction. Here, together with the pulling out, the area of the overlapping part of the central prepreg layer that receives the perpendicular load decreases. Therefore, suitably, assuming that the sum of the area of the overlapping part converted into a pull-out displacement (an area having a width of 30 mm and a length of 60 mm—the pull-out displacement) and the area that receives the load from the spacer (an area having a width of 30 mm and a length of 10 mm) receives 168 N, the perpendicular load applied to the overlapping part is proportionally calculated, and the pull-out load is divided by twice the perpendicular load and taken as the coefficient of interlayer friction. The coefficient of interlayer friction varies not only with the temperature but also with the pull-out speed and the perpendicular stress and over a time course. Therefore, in the present invention, at a pull-out speed of 0.2 mm/min and a perpendicular stress of 0.8 bar, the coefficient of interlayer friction after 5 minutes from the start of pulling out, that is, at a pull-out displacement of 1 mm, was measured. The measurement was performed five times, and the average was taken as the coefficient of interlayer friction.

The prepreg is preferably such that in the measurement of the coefficient of interlayer friction, the temperature at which the coefficient of interlayer friction is 0.02 or less is present in a temperature region having a width of 20° C. or more. It is preferable that in the measurement of the coefficient of interlayer friction, the temperature at which the coefficient of interlayer friction is preferably 0.015 or less, still more preferably 0.01 or less, is present in a temperature region having a width of 20° C. or more. It is still more preferable that in the measurement of the coefficient of interlayer friction, the temperature at which the coefficient of interlayer friction is within the above range is present within a temperature range of 50° C. to 80° C. in a temperature region having a width of 20° C. or more. Incidentally, in the present invention, the coefficient of interlayer friction is measured every 10° C. in a temperature range of 40 to 100° C., and when the coefficient of interlayer friction is 0.02 or less at three continuous temperatures, it is judged that the width of the temperature region at which the coefficient of interlayer friction is 0.02 or less is 20° C. or more.

In the step of shaping a prepreg laminate, depending on the temperature control conditions, a temperature distribution often occurs in the prepreg laminate. For example, in the case where the prepreg laminate is heated with a one-side heating source, an IR heater, or the like, a temperature distribution occurs in the thickness direction of the prepreg laminate. In addition, for example, when the prepreg laminate heated in an oven or the like is shaped on a mandrel at room temperature, the prepreg laminate is cooled during shaping from the surface that is in contact with the mandrel, and a temperature distribution occurs inside the prepreg laminate. Therefore, in order to achieve a reproducible shaping step, the prepreg is preferably such that the temperature region in which interlayer slippage is suitable has a width of 20° C. or more. It is still more preferable that the temperature region has a width of 30° C. or more.

The prepreg is preferably such that in the case where the prepreg is maintained at the same temperature as in the measurement of the coefficient of interlayer friction for 60 minutes, and then the coefficient of interlayer friction is measured under the same conditions as in the measurement of the coefficient of interlayer friction, the temperature at which the relative increase rate of the coefficient of interlayer friction is 20% or less is present within a temperature range of 40 to 100° C. It is preferable that the temperature at which the increase rate is 10% or less is present within a temperature range of 40 to 100° C. It is still more preferable that the width of the temperature region in which the increase rate is 20% or less is 20° C. or more, and it is still more preferable that the width of the temperature region in which the increase rate is 10% or less is 20° C. or more. It is still more preferable that the temperature range is 50 to 80° C. In the present invention, in the measurement of the coefficient of interlayer friction, pulling out is started after 10 minutes from the start of perpendicular load application to the prepregs with a pressure plate controlled at the test temperature. In the same manner, pulling out is also started after 70 minutes from the start of perpendicular load application, and the obtained coefficient of interlayer friction is compared with the above coefficient of interlayer friction. As a result, the increase rate of the coefficient of interlayer friction over a 60-min time course can be calculated. The coefficient of interlayer friction varies over a time course as described above. This is presumably because when the prepregs continuously receive a perpendicular load, due to the resin movement and the shift of fibers, a structural change occurs in the prepregs themselves.

The prepreg laminate includes a heat insulating layer, such as air, and thus it often takes time to control the temperature at the desired temperature for shaping. In an actual shaping step, because the application of pressure increases the temperature ramp rate, heating is often performed under pressurization. Therefore, changes in the coefficient of interlayer friction when temperature control is performed under pressurization for about 60 minutes are important. It is still more preferable that the increase rate of the coefficient of interlayer friction is 10% or less.

It is preferable that when prepregs are quasi-isotropically laid up, formed into a laminate, and cured, and the laminate is processed into a planar specimen as defined in ASTM D7137/7137M-07, the laminate has a compressive strength after impact (CAI) of 250 MPa or more as measured in accordance with ASTM D7137/7137M-07. The compressive strength after impact (CAI) is preferably 300 MPa or more, and still more preferably 350 MPa. Incidentally, the drop-impact step, which causes delamination in the specimen, is performed in accordance with ASTM D7136/7136M-07. The test is performed five times, and the average is taken as the compressive strength after impact (CAI). Higher CAI indicates higher impact characteristics, and such a laminate is suitable for the design requirements of an aircraft structural member and contributes to weight reduction of the member. Here, "quasi-isotropically laid up" means that the prepregs are laid up while making small shifts in the fiber direction, whereby the orientation of fibers is isotropic in the entire laminate. In the present invention, 16 prepreg plies are laid up while making a difference of 45° between the fiber directions of adjacent prepregs, and the CAI of such a laminate is measured.

It is preferable that when the prepregs of the present invention are unidirectionally laid up, formed into a laminate, and cured, the laminate has a fracture toughness $G_{IC}$ of 450 J/m$^2$ or more as measured in accordance with JIS K7086-1993. The fracture toughness $G_{IC}$ is still more preferably 550 J/m$^2$ or more. The test is performed five times, and the average is taken as the fracture toughness $G_{IC}$. When the interlayer toughness is high, unexpected fracture in the direction out of the fiber orientation direction can be prevented. In particular, fracture of an aircraft structural member mostly occurs in mode I, where $G_{IC}$ is an important dynamic characteristic. Here, "unidirectionally laid up" means that prepregs are laid up to have the same fiber direction.

It is preferable that when the prepregs of the present invention are unidirectionally laid up, formed into a laminate, and cured, the laminate has a fracture toughness $G_{IIC}$ of 2,200 J/m$^2$ or more as measured in accordance with JIS K7086-1993. The fracture toughness $G_{IIC}$ is still more preferably 2,900 J/m$^2$ or more. The test is performed five times, and the average is taken as the fracture toughness $G_{IIC}$. Similarly to $G_{IC}$, when the interlayer toughness is high, unexpected fracture in the direction out of the fiber orientation direction can be prevented. It is known that skin-stringer separation, which is one of the fracture modes of an aircraft structural member, occurs in mode II, where $G_{IIC}$ is as an important dynamic characteristic. In addition, in order to improve CAI, it is effective to improve $G_{IIC}$ and thereby suppress delamination caused by an out-of-plane impact load. Also for the achievement of high impact strength, $G_{IIC}$ is an important dynamic characteristic.

The thermoplastic resin insoluble in the thermosetting resin contained in the resin layer may be in the form of a nonwoven fabric or fibers. However, in order to obtain a fiber-reinforced plastic that develops high impact strength, particles are preferable. When the resin is in the form of particles, at the time of interlayer slippage, the physical relationship of particles can be changed. Therefore, as compared with the form of a nonwoven fabric or fibers, the coefficient of interlayer friction can be more reduced. The particle shape may be any of spherical, non-spherical, porous, needle-like, whisker-like, and flake-like, but a spherical shape is particularly preferable.

It is preferable that the sphericity of thermoplastic resin particles is within a range of 90 to 100, more preferably 95 or more, and still more preferably 97 or more. At the time of interlayer slippage, particles contact with each other. Therefore, a shape closer to a true sphere causes less resistance, and, as a result, wrinkling is less likely to occur.

It is still more preferable that of the thermoplastic resin particles, particles having a particle size of 1 μm or less comprise 1 vol % or less of the total amount of particles. It is preferable that particles having a particle size of 2 or less comprise 1 vol % or less of the total amount of particles, and it is still more preferable that particles having a particle size of 3 μm or less comprise 1 vol % or less of the total amount of particles. When the amount of particles having a small particle size is reduced, at the time of interlayer slippage, the total surface area of particles that receives resistance decreases. As a result, wrinkling is less likely to occur.

However, in the case where the thermoplastic resin is in the form of particles, the thermoplastic resin has high hardness in a temperature region where the prepreg laminate is shaped, and interferes with fibers, causing an increase in the coefficient of interlayer friction. In addition, in order to reduce the reactivity of the curing agent contained in the thermosetting resin to prolong the storage life of the prepreg, a solid curing agent may be incorporated in the form of particles. These particles interfere with fibers and the thermoplastic resin, resulting in an increase in the coefficient of interlayer friction. In the resin layer placed on the prepreg surface, the lower the content of these particles is, the lower the coefficient of interlayer friction can be. However, for the development of dynamic characteristics, particularly high impact strength, the presence of particles is inevitable.

According to the analysis of the present inventors, when a prepreg laminate is heated and pressurized, the thermosetting resin in the resin layer is impregnated into the fiber layer, whereby the volume proportion of particles contained in the resin layer increases; it has been found that such an increase is a major factor that worsens the coefficient of interlayer friction.

In order to suppress the impregnation of the thermosetting resin into the fiber layer, it is suitable that the thermoplastic resin insoluble in the thermosetting resin is localized on the fiber layer surface. The thermoplastic resin serves as a filter and also plays the role of binding fibers together, whereby the impregnation of the thermosetting resin into the fiber layer is delayed. In addition, it is effective that the glass transition temperature of the fiber layer Tgf is within a range of 5 to 30° C. Tgf is still more preferably within a range of 10 to 20° C. The glass transition temperature of a fiber layer Tgf in a general prepreg is a freezing point or lower. However, when the glass transition temperature Tgf is within a range of 5 to 30° C., the resin viscosity of the fiber layer and the adhesion of fibers with each other are increased, and the subduction of particles is suppressed, whereby the coefficient of interlayer friction can be significantly reduced.

It is still more preferable that the glass transition temperature of the fiber layer Tgf is higher than the glass transition temperature of the resin layer Tgr. It is still more preferable Tgf is at least 5° C. higher than Tgr. When a thermoplastic resin insoluble in the thermosetting resin is contained in the resin layer, Tg is often higher than that of the fiber layer in a general prepreg. However, when the glass transition temperature of the fiber layer Tgf is higher than the glass transition temperature of the resin layer Tgr, the thermosetting resin of the fiber layer is less likely, to move to the fiber layer containing the higher-viscosity thermosetting resin, whereby the coefficient of interlayer friction can be significantly reduced. As a method for increasing the glass transition temperature of a fiber layer Tgf, a method in which a thermosetting resin having a higher glass transition temperature than the thermosetting resin used, for the resin layer is impregnated into fibers to form a fiber layer is possible. In addition, a method in which a thermosetting resin is impregnated into carbon fibers to form a fiber layer, then a thermal history is added to the fiber layer to improve Tgf, and subsequently the resin layer is disposed on the fiber layer surface, is also preferable.

The glass transition temperature is measured using a differential scanning calorimeter (DSC) in accordance with JIS K7121 (1987). In the present invention, the glass transition temperature of a resin layer Tgr is measured as follows. The resin layer on the prepreg surface is scraped off with a spatula carefully so as not to allow for the incorporation of fibers. 3 to 5 mg of the sample (specimen) is charged into an airtight sample container having a volume of 50 μl and heated in a nitrogen atmosphere from −30 to 250° C. at a temperature ramp rate of 10° C./min, and the glass transition temperature is measured. In addition, the glass transition temperature of a fiber layer Tgf is measured as follows. The resin layer on the each side of a prepreg is scraped off with a spatula strongly so that the fibers of the fiber layer are partially incorporated. The remaining fiber layer is cut with a cutter, 10 to 20 mg of the sample (specimen) is charged into an airtight sample container having a volume of 50 μl and heated in a nitrogen atmosphere from −30 to 250° C. at a temperature ramp rate of 10° C./min, and the glass transition temperature is measured. From the obtained DSC curve, the glass transition temperature (Tmg), which is the midpoint of the portion showing the stepwise change, is measured. Specifically, at the portion showing the stepwise change in the obtained DSC curve, the temperature of the point at which the straight line at an equal distance in the vertical axis direction from the straight line extending from each baseline intersects with the curve of the portion showing the stepwise change in glass transition is taken as the glass transition temperature.

The ease of impregnation of a thermosetting resin into a resin layer can be evaluated by heating the prepreg in an oven or the like and observing the surface coverage of the resin. In particular, the areal number density of particles exposed to the surface after being exposed for a predetermined period of time in a heated state serves as an index of the coefficient of interlayer friction, and it has been found that the coefficient of interlayer friction is significantly reduced by reducing the number density, whereby wrinkling is suppressed during the shaping of a prepreg laminate. In particular, it is preferable that in the case where the prepreg is exposed in air at a constant temperature for 1 hour, and then the areal number density of particles on a surface of the prepreg is measured every 10° C. in a temperature range of 40 to 100° C., the temperature at which the areal number density of particles is 300/mm$^2$ or less is present within a temperature range of 40 to 100° C. The number density is more preferably 250/mm$^2$ or less, and still more preferably 200/mm$^2$ or less. It is still more preferable that the temperature range is a temperature range of 50° C. to 80° C. The measurement of the areal number density of particles on the prepreg surface is performed at ten points extracted from the sampled prepreg surface. On a plate controlled at a predetermined temperature, a prepreg immediately after the removal of a release paper is disposed with the surface from which the release paper has been removed facing upward, and heated for 10 minutes. Subsequently, while applying light in parallel to the fiber direction at an angle of ±45° above from the prepreg surface, an area of 1 mm$^2$±0.2 mm$^2$ is imaged using an optical microscope at a magnification of 200, thereby giving a digital image. By applying light in the fiber direction, irregularities due to the fibers are canceled, and only the projections of particles are extracted. The image is converted into gray scale by the NTSC weighted average method, and binarization is performed using the luminance higher than the average of the minimum luminance and the maximum luminance as the threshold. Recognizing independent white parts as particles, the number of particles is counted, and the number of particles is divided by the actually imaged area. The average of the extracted ten points is taken as the areal number density. Incidentally, in this operation, in the case where grains are aggregated and recognized as a mass larger than 10 μm, the threshold is adjusted toward the higher-luminance side until the grains are recognized independently.

In addition, when the particle content is the same in the thermoplastic resin, solid curing agent, etc., the particle size is increased to reduce the number of particles, thereby reducing the probability of contact of particles with each other or with fibers, whereby the coefficient of interlayer friction can be reduced.

It is preferable that the prepreg of the present invention has an impregnation ratio of 2 mass % or less as measured using a water pick-up method. The impregnation ratio is more preferably 1 mass % or less, and still more preferably 0.5 mass % or less. According to a water pick-up method, a prepreg is immersed in water, whereby moisture enters the void space in the prepreg due to capillarity phenomena, and the mass of moisture that has entered is calculated as a proportion to serve as an index of the impregnating properties. In the present invention, a 100×100 mm prepreg was prepared, its mass was measured, and then 6 mm of the prepreg was submerged in a beaker containing water perpendicularly in the direction of 0°. The mass after 5 minutes of immersion was measured, and the increment of the mass after immersion in water was divided by the initial mass and taken as the impregnation ratio (mass %). Therefore, a lower impregnation ratio indicates more sufficient impregnation of the matrix resin into the fiber layer. When the impregnation ratio of the fiber layer is improved, the movement of the thermosetting resin from the resin layer is less likely to occur, and the coefficient of interlayer friction can be reduced.

EXAMPLES

Hereinafter, the present invention will be described in further detail through examples. However, the present invention is not limited to the inventions described in the examples. The resin raw materials used in the examples, as well as the preparation methods and evaluation methods for prepregs and fiber-reinforced plastics, will be shown below. Unless otherwise noted, the production environment and evaluation of the prepregs in the examples were performed in an atmosphere at a temperature of 25° C.±2° C. and a relative humidity of 50%.

(1) Measurement of Compressive Strength After Impact (CAI)

CAI was measured by the following operations (a) to (e).

(a) 16 unidirectional prepreg plies were laid up with $[45/0/-45/90]_{2S}$.

(b) The prepreg laminate was tightly covered with a nylon film, then heated in an autoclave to 180° C. at a temperature ramp rate of 1.5° C./min, and heat-pressed and cured at a temperature of 180° C. and a pressure of 7 kg/cm$^2$ for 2 hours, thereby forming a quasi-isotropic material (carbon-fiber-reinforced plastic).

(c) From the planar carbon-fiber-reinforced plastic, defining 0° as the length direction, a CAI specimen having a length of 150±0.25 mm and a width of 100±0.25 mm was cut out.

(d) In accordance with the test method defined in ASTM D7136/7136M-07, falling weight and ultrasonic inspection were performed, and the damaged area was measured. The energy of the impact given to the panel was calculated from the average thickness of nine points of the formed plate, and was set at 28.4 J for all specimens.

(e) In accordance with the test method defined in ASTM D7137/7137M-07, CAI strength was measured using "INSTRON®" Universal Tester, Model 4208. The number of measurement specimens was 5, and the average was taken as the CAI strength.

(2) Measurement of Mode-I Interlayer Toughness ($G_{IC}$)

$G_{IC}$ was measured by the following operations (a) to (e) in accordance with JIS K7086 (1993).

(a) 16 unidirectional prepreg plies were laid up to have the same fiber direction. However, in order to cause initial cracking in the laminate's midplane (between the eighth ply and the ninth ply), a film made of fluorine resin having a thickness of 12.5 μm was inserted 40 mm in the direction of 0° from an end portion of the laminate.

(b) The prepreg laminate was tightly covered with a nylon film, then heated in an autoclave to 180° C. at a temperature ramp rate of 1.5° C./min, and heat-pressed and cured at a temperature of 180° C. and a pressure of 7 kg/cm$^2$ for 2 hours, thereby forming a unidirectionally reinforced material (carbon-fiber-reinforced plastic).

(c) Defining 0° as the length direction, the unidirectionally reinforced material (carbon-fiber-reinforced plastic) obtained in (b) was cut to a width of 20 mm and a length of 195 mm. Cutting was performed such that the fiber direction was parallel to the length side of the sample.

(d) In accordance with JIS K7086 (1993), a block for pin loading (25 mm in length, made of aluminum) was attached to one end of the specimen (film-sandwiched side).

(e) A white coating material was applied to both surfaces of the specimen to facilitate the observation of crack growth.

Using the produced unidirectionally reinforced material (carbon-fiber-reinforced plastic), $G_{IC}$ measurement was performed through the following procedures.

In accordance with JIS K7086 (1993), Appendix 1, the test was performed using "INSTRON®", Model 5565. The crosshead speed was 0.5 mm/min until the crack growth reached 20 mm, and was 1 mm/min after 20 mm was reached. In accordance with JIS K7086 (1993), $G_{IC}$ (GIC in the early stage of crack growth) was calculated from the load, displacement, and crack length. The number of the measured specimens was 5, and the average was taken as $G_{IC}$.

(3) Measurement of Mode-II Interlayer Toughness ($G_{IIC}$)

In accordance with JIS K7086 (1993), $G_{IIC}$ was measured by the following operations (a) to (d).

(a) 16 unidirectional prepreg plies were laid up to have the same fiber direction. However, in order to cause initial cracking in the laminate's midplane (between the eighth ply and the ninth ply), a film made of fluorine resin having a thickness of 12.5 μm was inserted 40 mm in the direction of 0° from an end portion of the laminate.

(b) The prepreg laminate was tightly covered with a nylon film, then heated in an autoclave to 180° C. at a temperature ramp rate of 1.5° C./min, and heat-pressed and cured at a temperature of 180° C. and a pressure of 7 kg/cm² for 2 hours, thereby forming a unidirectionally reinforced material (carbon-fiber-reinforced plastic).

(c) Defining 0° as the length direction, the unidirectionally reinforced material (carbon-fiber-reinforced plastic) obtained in (b) was cut to a width of 20 mm and a length of 195 mm. Cutting was performed such that the fiber direction was parallel to the length side of the sample.

(d) A white coating material was applied to both surfaces of the specimen to facilitate the observation of crack growth.

Using the produced unidirectionally reinforced material (carbon-fiber-reinforced plastic), $G_{IIC}$ measurement was performed through the following procedures.

In accordance with JIS K7086 (1993), Appendix 2, the test was performed using "INSTRON®", Model 5565. The crosshead speed was 1 mm/min. In accordance with JIS K7086 (1993), $G_{IIC}$ corresponding to the critical load in the early stage of crack growth ($G_{IIC}$ in the early stage of crack growth) was calculated from the load, displacement, and crack length. The number of the measured specimens was 5, and the average was taken as $G_{IIC}$.

(4) Measurement of Interlayer Friction of Prepreg

The coefficient of interlayer friction was measured by the following operations (a) to (c).

(a) As shown in FIG. 1, defining 0° as the length direction, on a first-layer prepreg 4 cut to a width of 40 mm and a length of 150 mm, a second-layer prepreg 3 cut to a width of 30 mm and a length of 150 mm was laid up such that they overlapped in an area having a width of 30 mm and a length of 60 mm. Further, a prepreg to serve as a spacer 5 having a width of 30 mm and a length of 20 mm was laid up to contact the overlapping part of the second layer, and then a third-layer prepreg 4 having a width of 40 mm and a length of 150 mm was laid up to overlap the first layer. Subsequently, a release paper 2 having a width of 40 mm×a length of 30 mm was attached to overlap the outer sides of the first layer and the third layer.

(b) To the overlapping parts and a 10-mm-long area of the spacer (an area having a width of 30 mm and a length of 70 mm), a constant perpendicular load of 168 N was applied while controlling the temperature at a predetermined temperature with the pressure plate 1 having a heating source.

(c) After 10 minutes from the start of perpendicular load application, the second-layer prepreg was pulled out at a pull-out speed of 0.2 mm/min in the fiber direction, and the pull-out load was measured. Together with the pulling out, the area of the overlapping part of the second-layer prepreg that receives the perpendicular load decreases. Therefore, the pull-out load divided by twice the perpendicular load received by the area of the overlapping part converted into a pull-out displacement, that is, 168 N×(60 mm−the pull-out displacement)/(70 mm−the pull-out displacement)×2, is taken as the coefficient of interlayer friction. The coefficient of interlayer friction after 5 minutes from the start of pulling out, that is, at a pull-out displacement of 1 mm, was measured five times, and the average was taken as the value of the coefficient of interlayer friction.

(5) Measurement of Glass Transition Temperatures of Fiber Layer and Resin Layer

In accordance with JIS K7121 (1987), the glass transition temperatures of a fiber layer and a resin layer were measured using a differential scanning calorimeter (DSC). As the analyzer, a differential scanning calorimeter (DSC) manufactured by TA Instruments was used.

The glass transition temperature of a resin layer was measured by the following operations (a) to (b).

(a) The resin layer on the prepreg surface was scraped off with a spatula carefully so as not to allow for the incorporation of fibers.

(b) 3 to 5 mg of the sample scraped off in (a) was charged into an airtight sample container having a volume of 50 μl and heated from −30 to 250° C. at a temperature ramp rate of 10° C./min. From the obtained DSC curve, the glass transition temperature (Tmg), which is the midpoint of the portion showing the stepwise change, was measured. Specifically, at the portion showing the stepwise change in the obtained DSC curve, the temperature of the point at which the straight line at an equal distance in the vertical axis direction from the straight line extending from each baseline intersects with the curve of the portion showing the stepwise change in glass transition was taken as the glass transition temperature.

Similarly, the glass transition temperature of a fiber layer was measured by the following operations (c) to (d).

(c) The resin layers of both sides of a prepreg were scraped off with a spatula strongly so that the fibers of the fiber layer were partially incorporated.

(d) The fiber layer remaining in (c) was cut with a cutter, and 10 to 20 mg thereof was charged into an airtight sample container having a volume of 50 μl and heated from −30 to 250° C. at a temperature ramp rate of 10° C./min. From the obtained DSC curve, the glass transition temperature (Tmg), which is the midpoint of the portion showing the stepwise change, was measured.

(6) Measurement of Impregnation Ratio of Prepreg by Water Pick-Up Method

The impregnation ratio was measured by the following operations (a) to (c).

(a) A 100×100 mm prepreg was prepared, a release paper was peeled off, and the mass was measured.

(b) 6 mm of the prepreg was submerged in a beaker containing water perpendicularly in the direction of 0°, and the mass after 5 minutes of immersion was measured.

(c) The increment of the mass after immersion in water was divided by the initial mass and taken as the impregnation ratio (mass %). Incidentally, the number of the measured specimens was 5, and the average was taken as the impregnation ratio.

(7) Hot-Forming Test

A hot-forming test was performed, and the presence of wrinkles was judged by the following operations (a) to (e).

(a) Defining 0° as the length direction, 24 prepreg layers each having a width of 15 cm and a length of 45 cm were laid up with [45/-45/0/90]$_{3S}$.

(b) The prepreg laminate produced in (a) was temperature-controlled in an oven at 60° C. for 30 minutes.

Figure 2:
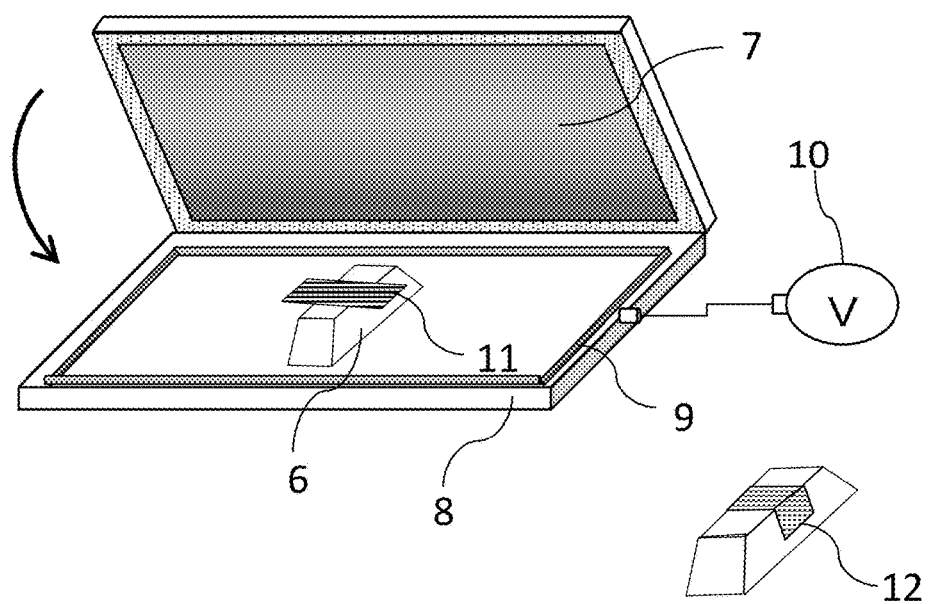
FIG. 2 is a schematic diagram showing the hot-forming test of the present invention.

(c) A shaping mold 6 having a width of 15 cm, a height of 20 cm, and R=5 mm as shown in FIG. 2 was set in a frame 8 having a seal 9 equipped with a silicone rubber 7.

(d) The prepreg laminate 11 was disposed on the shaping mold 6, and the device was evacuated at room temperature using a vacuum pump 10 over 150 seconds. As a result, a shaped prepreg laminate 12, with both ends of the laminate being bent at 90°, was obtained.

(e) The presence of wrinkles formed in the inner side of the bent portions of the shaped prepreg laminate 12 was rated into the following three types: deep wrinkles, fine wrinkles that would disappear as a result of forming, and no wrinkles.

(8) Measurement of Areal Number Density of Particles on Prepreg Surface

Ten points were extracted from a region about 1.2 mm×0.9 mm on the prepreg surface. On a plate controlled at a predetermined temperature, a prepreg immediately after the removal of a release paper was disposed with the surface from which the release paper had been removed facing upward, and heated for 10 minutes. Subsequently, while applying light in parallel to the fiber direction at an angle of ±45° above from the prepreg surface, the prepreg was imaged using an optical microscope at a magnification of 200, thereby giving a digital image. The digital image was converted into gray scale by the NTSC weighted average method using an image processing software ImagePro®, and the minimum luminance and the maximum luminance were normalized to a luminance of 0 and a luminance of 255, respectively. After binarization to recognize a luminance of 127 or less as black and a luminance of 128 or more as white, the number of independent white parts was counted and divided by the imaged area. The average of the extracted ten points was taken as the areal number density of particles on the prepreg surface.

(9) Measurement of Sphericity of Thermoplastic Particles

The particle size of the individual thermoplastic particles was measured as follows. Particles were observed under a scanning electron microscope (scanning electron microscope JSM-6301NF manufactured by JEOL Ltd.) at a magnification of 1,000, and the length was measured. Arbitrary 30 particles were selected from the photograph, the minor and major axes were measured, and the sphericity was calculated according to the following equation.

$$\text{Sphericity} = \frac{100}{n} \sum_{i=1}^{n} \left( \frac{i^{th} \text{ particle minor axis}}{i^{th} \text{ particle major axis}} \right) \quad \text{[Equation 1]}$$

Incidentally, n: the number of measurements, 30.

(10) Measurement of Particle Size Distribution of Thermoplastic Particles

Particles were placed in distilled water to a particle concentration of 0.1 mass % and dispersed by an ultrasonic treatment. Using the obtained dispersion as a measurement sample, the particle size distribution was measured using a laser diffraction particle size distribution analyzer (LA-950: manufactured by HORIBA, Ltd.). The particle size detection region was 0.01 to 100 µm, and the setting was such that the region was divided into 70. The volumetric relative amount of particles was plotted on the vertical axis, while the logarithm of the particle size was plotted on the horizontal axis, and the plots were connected with a straight line, forming a chart of particle size distribution.

(11) Evaluation of Insolubility of Thermoplastic Resin Particles

The 0° cross-section of the unidirectionally reinforced material produced in (2) was ground until a clear interface was seen between the reinforcing fibers and the thermosetting resin, and the surface was observed under an optical microscope to observe thermoplastic resin particles in the resin layer present between the fiber layers. At this time, in the case where a clear interface was seen between the granular thermoplastic resin particles and the surrounding thermosetting resin, the particles were considered to be insoluble. Meanwhile, when the thermoplastic resin particles were not distinguishable from the surrounding thermosetting resin, the particles were considered to be soluble.

Reference Example 1

(a) Preparation of Thermoplastic Resin Particles 90 parts by mass of a transparent polyamide (product name: "GRILAMID®"-TR55, manufactured by EMSER Werke), 7.5 parts by mass of an epoxy resin (product name: "EPIKOTE®" 828, manufactured by Shell Petrochemical Co., Ltd.), and 2.5 parts by mass of a curing agent (product name: "TOHMIDE®" #296, manufactured by Fuji Kasei Kogyo Co., Ltd.) were added to a solvent mixture containing 300 parts by mass of chloroform and 100 parts by mass of methanol, thereby giving a uniform solution. Next, the obtained uniform solution was atomized using a coating spray gun, thoroughly mixed, and then sprayed toward the liquid surface of 3,000 parts by mass of n-hexane in order to cause precipitation in the solution. The precipitated solid was separated by filtration, sufficiently washed with n-hexane, and then vacuum-dried at 100° C. for 24 hours, thereby giving spherical epoxy modified nylon particles. The epoxy modified nylon particles were classified using a CCE classifier manufactured by CCE Technologies, Inc. The 90 vol % particle size of the obtained particles was 28 µm, and the CV value was 60%. In addition, as a result of observation under a scanning electron microscope, the obtained powder was polyamide fine particles in the form of fine particles having a sphericity of 96 with an average particle size of 14 µm.

(b) Preparation of Resin Composition (1) 13 parts by mass of PES5003P was added to 60 parts by mass of "ARALDITE®" MY9655 and 40 parts by mass of "EPON®" 825 in a kneader and dissolved, and subsequently 45 parts by mass of "ARADUR®" 9664-1 was added as a curing agent and kneaded, thereby giving a thermosetting resin composition (1).

(2) 16 parts by mass of PES5003P was added to 60 parts by mass of "ARALDITE®" MY9655 and 40 parts by mass of "EPON®" 825 in a kneader and dissolved, then 80 parts by mass of the above thermoplastic resin particles was added and kneaded, and subsequently 45 parts by mass of "ARADUR®" 9664-1 was added as a curing agent and kneaded, thereby giving a thermosetting resin composition (2).

(c) Production of Prepreg

The thermosetting resin composition (1) produced in (b), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.25 MPa, thereby producing a unidirectional carbon-fiber-reinforced prepreg. As a result of measurement using a water pick-up method, the impregnation ratio of the produced prepreg was 3.8 mass %. Further, the thermosetting resin composition (2) produced in (b), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 100° C. and a roller pressure of 0.07 MPa. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 1

The thermosetting resin composition (1) produced in Reference Example 1, (b), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.55 MPa, which is higher than in Reference Example 1, thereby producing a unidirectional carbon-fiber-reinforced prepreg. The impregnation ratio of the produced prepreg was measured using a water pick-up method, and, as a result, it turned out that the impregnation ratio was as extremely high as 1.3 mass %. Subsequently, further, the thermosetting resin composition (2) produced in Reference Example 1, (b), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 100° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 2

The thermosetting resin composition (1) produced in Reference Example 1, (b), (1), was applied to a release paper using a knife coater, thereby producing two resin films each having a resin content of 26 g/m² with a lower areal weight lower than in Reference Example 1. Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.25 MPa, thereby producing a unidirectional carbon-fiber-reinforced prepreg. The impregnation ratio of the produced prepreg was measured using a water pick-up method, and, as a result, it turned out that the impregnation ratio was as low as 6.0 mass %. Subsequently, further, the thermosetting resin composition (2) produced in Reference Example 1, (b), (2), was applied to a release paper using a knife coater, thereby producing two resin films each having a resin content of 40 g/m² with a higher areal weight than in Reference Example 1. The resin films were laid up on the surfaces of the unidirectional carbon-fiber-reinforced prepreg produced above, and the resin was laid up at a roller temperature of 90° C. and a roller pressure of 0.07 MPa. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 3

The thermosetting resin composition (1) produced in Reference Example 1, (b), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.55 MPa, which is higher than in Reference Example 1, thereby producing a unidirectional carbon-fiber-reinforced prepreg. The impregnation ratio of the produced prepreg was measured using a water pick-up method, and, as a result, it turned out that the impregnation ratio was as extremely high as 1.5 mass %. Subsequently, the prepreg was heated in an oven at 100° C. for 20 minutes to dissolve some of the granular curing agent that could cause interlayer friction. Further, the thermosetting resin composition (2) produced in Reference Example 1 (b), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 90° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 4

The thermosetting resin composition (1) produced in Reference Example 1, (b), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.55 MPa, which is higher than in Reference Example 1, thereby producing a unidirectional carbon-fiber-reinforced prepreg. The impregnation ratio of the produced prepreg was measured using a water pick-up method, and, as a result, it turned out that the impregnation ratio was as extremely high as 1.5 mass %. Subsequently, the prepreg was heated in an oven at 200° C. for 3 minutes to proceed the surface curing of the produced prepreg. Further, the thermosetting resin composition (2) produced in Reference Example 1, (b), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 90° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 5

The thermosetting resin composition (1) produced in Reference Example 1, (b), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T1100GC-24K), and the resin was impregnated into the carbon fiber sheet at a roller temperature of 110° C. and a roller pressure of 0.25 MPa, thereby producing a unidirectional carbon-fiber-reinforced prepreg. As a result of measurement using a water pick-up method, the impregnation ratio of the produced prepreg was 3.4 mass %. Further, the thermosetting resin composition (2) produced in Reference Example 1, (b), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 100° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Example 6

(a) Preparation of Thermoplastic Resin Particles (WO 2009/142231 was Referred to)

In a 1,000-ml pressure-resistant glass autoclave (HIPER-GLASTOR® TEM-V 100N manufactured by Taiatsu Techno) were placed 35 g of a polyamide (weight average molecular weight: 17,000, "TROGAMID®" CX7323 manufactured by Degussa AG) as a polymer A, 280 g of N-methyl-2-pyrrolidone as an organic solvent, and 35 g of a polyvinyl alcohol ("GOHSENOL®" GM-14 manufactured by Nippon Synthetic Chemical Industry Co., Ltd., weight average molecular weight: 29,000, sodium acetate content: 0.23 mass %, SP value: 32.8 $(J/cm^3)^{1/2}$) as a polymer B. After purging with nitrogen of 99 vol % or more, the mixture was heated to 180° C. and stirred for 2 hours until the polymers dissolved. Subsequently, 350 g of ion exchange water was added dropwise as a poor solvent at a speed of 2.92 g/min through a liquid-sending pump. At the time when about 200 g of ion exchange water was added, the system turned white. After the addition of the whole amount of water, the mixture was cooled with stirring. The obtained suspension was filtered, reslurry-washed with 700 g of ion exchange water added, separated by filtration, and then vacuum-dried at 80° C. for 10 hours, thereby giving 34 g of a gray-colored solid. As a result of observation under a scanning electron microscope, the obtained powder was polyamide fine particles in the form of fine particles having a sphericity of 98 with an average particle size of 13 μm, in which no particles having a particle size of 3 μm or less were present.

(b) Preparation of Resin Composition (1) A thermosetting resin composition (1) was prepared by the same method as in Reference Example 1, (b), (1).

(2) A thermosetting resin composition (3) was prepared by the same method as in Reference Example 1, (b), except that the particles produced in Example 6, (a), were blended as thermoplastic resin particles.

(c) Production of Prepreg

The thermosetting resin composition (1) produced in Reference Example 1, (b), (1), was applied to a release paper using a knife coater, thereby producing two resin films each having a resin content of 30 g/m². Next, the produced two resin films were each laid up on each side of a unidirectionally arranged carbon fiber sheet ("TORAYCA®" T1100GC-24K), and the resin was impregnated into the carbon fiber sheet at a roller temperature of 110° C. and a roller pressure of 0.25 MPa, thereby producing a unidirectional carbon-fiber-reinforced prepreg. As a result of measurement using a water pick-up method, the impregnation ratio of the produced prepreg was 2.8 mass %. Further, the thermosetting resin composition (3) produced in Reference Example 6, (b), (2), was applied to a release paper using a knife coater, thereby producing two resin films each having a resin content of 21 g/m². The resin films were each laid up on each side of the unidirectional carbon-fiber-reinforced prepreg produced above, and the resin was laid up at a roller temperature of 100° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 190 g/m², and the matrix resin content was 35 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Reference Example 2

(a) 94 parts by mass of a transparent polyamide (product name: "GRILAMID®"-TR55, manufactured by EMSER Werke), 4 parts by mass of an epoxy resin (product name: "EPIKOTE®" 828, manufactured by Shell Petrochemical Co., Ltd.), and 2 parts by mass of a curing agent (product name: "TOHMIDE®" #296, manufactured by Fuji Kasei Kogyo Co., Ltd.) were added to a solvent mixture containing 300 parts by mass of chloroform and 100 parts by mass of methanol, thereby giving a uniform solution. Next, the obtained uniform solution was atomized using a coating spray gun, mixed, and then sprayed toward the liquid surface of 3,000 parts by mass of n-hexane in order to cause precipitation in the solution. The precipitated solid was separated by filtration, sufficiently washed with n-hexane, and then vacuum-dried at 100° C. for 24 hours, thereby giving epoxy modified nylon particles. From the epoxy modified nylon particles, small- and large-particle-size components were removed using a sieve, thereby giving particles having a relatively uniform particle size distribution. In addition, as a result of observation under a scanning electron microscope, the obtained powder was polyamide fine particles in the form of fine particles having a sphericity of 85 with an average particle size of 18 μm.

(b) Preparation of Resin Composition (1) A thermosetting resin composition (1) was prepared by the same method as in Reference Example 1, (b), (1).

(2) A thermosetting resin composition (4) was prepared by the same method as in Reference Example 1, (b), except that the particles produced in Reference Example 2, (a), were blended as thermoplastic resin particles.

(c) Production of Prepreg

The thermosetting resin composition (1) produced in Reference Example 1, (b), (1), was applied to a release paper using a knife coater, thereby producing two resin films each having a resin content of 30 g/m². Next, the produced two resin films were each laid up on each side of a unidirectionally arranged carbon fiber sheet ("TORAYCA®" T1100GC-24K), and the resin was impregnated into the carbon fiber sheet at a roller temperature of 110° C. and a roller pressure of 0.25 MPa, thereby producing a unidirectional carbon-fiber-reinforced prepreg. As a result of measurement using a water pick-up method, the impregnation ratio of the produced prepreg was 2.5 mass %. Further, the thermosetting resin composition produced in Reference Example 2, (b), (2), was applied to a release paper using a knife coater, thereby producing two resin films each having a resin content of 21 g/m². The resin films were each laid up on each side of the unidirectional carbon-fiber-reinforced prepreg produced above, and the resin was laid up at a roller temperature of 100° C. and a roller pressure of 0.02 MPa, which is lower than in Reference Example 1. In this manner, a unidirectional carbon-fiber-reinforced prepreg, in which a resin layer containing thermoplastic resin particles was disposed on each side of a fiber layer, the areal weight of fibers was 190 g/m², and the matrix resin content was 35 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Comparative Example 1

(a) Preparation of Resin Composition (1) 13 parts by mass of PES5003P was added to 60 parts by mass of "ARALDITE®" MY9655 and 40 parts by mass of "EPON®" 825 in a kneader and dissolved, and subsequently 45 parts by mass of "ARADUR®" 9664-1 was added as a curing agent and kneaded, thereby giving a thermosetting resin composition (5).

(2) 16 parts by mass of PES5003P was added to 60 parts by mass of "ARALDITE®" MY9655 and 40 parts by mass of "EPON®" 825 in a kneader and dissolved, and subsequently 45 parts by mass of "ARADUR®" 9664-1 was added as a curing agent and kneaded, thereby giving a thermosetting resin composition (6).

(b) Production of Prepreg

The thermosetting resin composition (5) produced in Comparative Example 1, (a), (1), was applied to a release paper using a knife coater, thereby producing two resin films each having a resin content of 36 g/m². Next, the produced two resin films were each laid up on each side of a unidirectionally arranged carbon fiber sheet ("TORAYCA®" T800S-12K), and the resin was impregnated into the carbon fiber sheet at a roller temperature of 110° C. and a roller pressure of 0.20 MPa, thereby producing a unidirectional carbon-fiber-reinforced prepreg. Further, the thermosetting resin composition (6) containing no thermoplastic resin particles produced in Comparative Example 1, (a), (2), was applied to a release paper using a knife coater, thereby producing two resin films each having a resin content of 30 g/m². The resin films were each laid up on each side of the unidirectional carbon-fiber-reinforced prepreg produced above, and the resin was laid up at a roller temperature of 110° C. and a roller pressure of 0.07 MPa. In this manner, a unidirectional carbon-fiber-reinforced prepreg, in which a resin layer containing no thermoplastic resin particles was disposed on each side of a fiber layer, the areal weight of fibers was 270 g/m², and the matrix resin content was 33 mass %, was produced.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

Comparative Example 2

(a) Preparation of Thermoplastic Resin Particles

Preparation was performed by the same method as in Reference Example 1, (a).

(b) Preparation of Resin Composition (1) 14.3 parts by mass of PES5003P was added to 60 parts by mass of "ARALDITE®" MY9655 and 40 parts by mass of "EPON®" 825 in a kneader and dissolved, and subsequently 45 parts by mass of "ARADUR®" 9664-1 was added as a curing agent and kneaded, thereby giving a thermosetting resin composition (7).

(c) Production of Prepreg

The thermosetting resin composition (7) produced in Comparative Example 2, (b), was applied to a release paper using a knife coater, thereby producing two resin films each having a resin content of 66 g/m$^2$. Next; the produced two resin films were each laid up on each side of a unidirectionally arranged carbon fiber sheet ("TORAYCA®" T800S-12K), and the resin was impregnated into the carbon fiber sheet at a roller temperature of 120° C. and a roller pressure of 0.3 MPa, thereby producing a unidirectional carbon-fiber-reinforced prepreg, in which the areal weight of fibers was 270 g/m$^2$, and the matrix resin content was 33 mass %.

Using the obtained prepreg, interlayer friction measurement, glass transition temperature (Tgf, Tgr) measurement, impregnation ratio measurement, surface observation, and a shaping test were performed. In addition, a carbon fiber composite material was produced using the obtained prepreg. The results are shown in Table 1 and Table 2.

TABLE 1

| Item | Temperature | Example 1 | Example 2 | Example 3 | Example 4 | Example 5 | Example 6 | Reference Example 1 | Reference Example 2 | Comparative Example 1 | Comparative Example 2 |
|---|---|---|---|---|---|---|---|---|---|---|---|
| Coefficient of Interlayer Friction | 40° C. | 0.094 | 0.065 | 0.063 | 0.059 | 0.10 | 0.10 | 0.15 | 0.15 | 0.026 | 0.16 |
| | 50° C. | 0.055 | 0.034 | 0.022 | 0.026 | 0.020 | 0.020 | 0.075 | 0.060 | 0.024 | 0.055 |
| | 60° C. | 0.020 | 0.019 | 0.017 | 0.015 | 0.016 | 0.020 | 0.051 | 0.050 | 0.020 | 0.053 |
| | 70° C. | 0.023 | 0.021 | 0.016 | 0.016 | 0.017 | 0.019 | 0.060 | 0.042 | 0.028 | 0.037 |
| | 80° C. | 0.030 | 0.034 | 0.020 | 0.019 | 0.018 | 0.018 | 0.073 | 0.040 | 0.030 | 0.038 |
| | 90° C. | 0.036 | 0.038 | 0.022 | 0.020 | 0.022 | 0.017 | 0.061 | 0.044 | 0.022 | 0.040 |
| | 100° C. | 0.035 | 0.033 | 0.021 | 0.018 | 0.030 | 0.019 | 0.049 | 0.045 | 0.018 | 0.044 |
| Coefficient of Interlayer Friction after 60 Minutes | 40° C. | 0.10 | 0.078 | 0.069 | 0.065 | 0.11 | 0.12 | 0.18 | 0.18 | 0.051 | 0.19 |
| | 50° C. | 0.078 | 0.082 | 0.025 | 0.028 | 0.021 | 0.022 | 0.19 | 0.15 | 0.039 | 0.10 |
| | 60° C. | 0.064 | 0.089 | 0.020 | 0.017 | 0.019 | 0.020 | 0.20 | 0.10 | 0.033 | 0.12 |
| | 70° C. | 0.068 | 0.088 | 0.024 | 0.018 | 0.020 | 0.018 | 0.19 | 0.12 | 0.050 | 0.15 |
| | 80° C. | 0.056 | 0.085 | 0.032 | 0.020 | 0.021 | 0.019 | 0.18 | 0.11 | 0.063 | 0.10 |
| | 90° C. | 0.050 | 0.050 | 0.029 | 0.020 | 0.033 | 0.017 | 0.17 | 0.11 | 0.058 | 0.12 |
| | 100° C. | 0.043 | 0.041 | 0.023 | 0.019 | 0.035 | 0.018 | 0.17 | 0.12 | 0.054 | 0.14 |
| Areal Number Density of Particles on Prepreg Surface (number of particles/mm$^2$) | 40° C. | 327 | 320 | 504 | 498 | 576 | 352 | 525 | 616 | 60 | 1148 |
| | 50° C. | 300 | 295 | 289 | 239 | 568 | 321 | 504 | 611 | 54 | 1078 |
| | 60° C. | 315 | 284 | 245 | 225 | 560 | 290 | 495 | 605 | 45 | 978 |
| | 70° C. | 486 | 412 | 298 | 245 | 605 | 365 | 615 | 747 | 63 | 2511 |
| | 80° C. | 552 | 486 | 412 | 420 | 742 | 421 | 685 | 817 | 72 | 4037 |
| | 90° C. | 865 | 769 | 506 | 552 | 944 | 558 | 881 | 1028 | 75 | 4357 |
| | 100° C. | 1198 | 1051 | 603 | 681 | 1152 | 684 | 1080 | 1250 | 78 | 4582 |

TABLE 2

| Item | Unit | Example 1 | Example 2 | Example 3 | Example 4 | Example 5 | Example 6 | Reference Example 1 | Reference Example 2 | Comparative Example 1 | Comparative Example 2 |
|---|---|---|---|---|---|---|---|---|---|---|---|
| Compressive Strength after Impact (CAI) | MPa | 300 | 310 | 310 | 300 | 350 | 360 | 290 | 350 | 150 | 290 |
| Mode-I Interlayer Toughness (G$_{IC}$) | J/m$^2$ | 570 | 580 | 570 | 560 | 430 | 540 | 570 | 550 | 350 | 560 |
| Mode-II Interlayer Toughness (G$_{IIC}$) | J/m$^2$ | 2190 | 2250 | 2240 | 2320 | 2900 | 2590 | 1860 | 2600 | 600 | 1840 |
| Glass Transition Temperature of Fiber Layer Tgf | ° C. | 2.5 | 3.0 | 16.1 | 15.6 | 1.3 | 4.2 | 0.6 | 4.0 | 2.1 | 1.0 |
| Glass Transition Temperature of Resin Layer Tgr | ° C. | 3.1 | 5.2 | 5.5 | 3.8 | 2.1 | 5.1 | 2.1 | 5.3 | 2.7 | 2.3 |
| Impregnation Ratio | % | 1.0 | 5.5 | 1.3 | 1.8 | 0.5 | 0.5 | 3.0 | 0.5 | 2.8 | 4.4 |
| Hot-Forming Test Shaping Test | — | Fine wrinkles | Fine wrinkles | No wrinkles | No wrinkles | No wrinkles | No wrinkles | Deep wrinkles | Deep wrinkles | No wrinkles | Deep wrinkles |
| Sphericity of Thermoplastic Resin Particles | — | 96 | 96 | 96 | 96 | 96 | 98 | 96 | 85 | — | 96 |
| Proportion of Particles having Particle Size of 1 μm or less in Thermoplastic Resin Particles | % | 5 | 5 | 5 | 5 | 5 | 0 | 5 | 6 | — | 5 |
| Evaluation of Insolubility of Thermoplastic Particles | — | Insoluble | Insoluble | Insoluble | Insoluble | Insoluble | Insoluble | Insoluble | Insoluble | — | Insoluble |

DESCRIPTION OF REFERENCE SIGNS

1: Pressure plate
2: Release paper
3: Second-layer prepreg
4: First-layer, third-layer prepreg
5: Spacer prepreg
6: Shaping mold
7: Silicone rubber
8: Frame
9: Seal
10: Vacuum pump
11: Prepreg laminate
12: Shaped prepreg laminate

The invention claimed is:

1. A prepreg comprising:
a fiber layer containing unidirectionally arranged carbon fibers impregnated with a first thermosetting resin; and
a resin layer disposed on at least one side of the fiber layer and containing a second thermosetting resin and a thermoplastic resin that is insoluble in the second thermosetting resin,
the prepreg having an areal weight of fibers and a weight fraction of resin and being configured such that
the areal weight of fibers and the weight fraction of resin in the prepreg are 120 to 300 g/m² and 25 to 50 mass %, respectively, and
wherein when a plurality of prepregs are laid up, and a coefficient of interlayer friction is measured every 10° C. in a temperature range of 40 to 100° C. at a pull-out speed of 0.2 mm/min under a perpendicular stress of 0.8 bar, the coefficient of interlayer friction is 0.02 or less at a temperature within a temperature range of 40 to 100° C.

2. The prepreg according to claim 1, wherein the thermoplastic resin is in particle form.

3. The prepreg according to claim 1, wherein the coefficient of interlayer friction is 0.02 or less at a temperature in a temperature region having a width of 20° C. or more.

4. The prepreg according to claim 1, wherein when the prepreg is maintained at a temperature within a temperature range of 40 to 100° C. for 60 minutes, the coefficient of interlayer friction exhibits a relative increase rate which is 20% or less.

5. The prepreg according to claim 1, wherein when a plurality of prepregs are quasi-isotropically laid up and formed into a laminate, the laminate has an average compressive strength after impact of 250 MPa or more as measured in accordance with ASTM D7137/7137M-07.

6. The prepreg according to claim 1, wherein when a plurality of prepregs are unidirectionally laid up and formed into a laminate, the laminate has an average fracture toughness $G_{IC}$ of 450 J/m² or more as measured in accordance with JIS K7086-1993.

7. The prepreg according to claim 1, wherein when a plurality of prepregs are unidirectionally laid up and formed into a laminate, the laminate has an average fracture toughness $G_{IIC}$ of 2,200 J/m² or more as measured in accordance with JIS K7086-1993.

8. The prepreg according to claim 1, wherein the fiber layer has a glass transition temperature Tgf within a range of 5 to 30° C.

9. The prepreg according to claim 1, wherein the fiber layer has a glass transition temperature Tgf, the resin layer has a glass transition temperature Tgr, and the glass transition temperature Tgf is higher than the glass transition temperature Tgr.

10. The prepreg according to claim 1, wherein the prepreg has an impregnation ratio of 2 mass % or less as measured using a water pick-up method.

11. The prepreg according to claim 2, wherein when the prepreg is exposed in air at a constant temperature for 1 hour to provide a surface of the prepreg having an areal number density of particles, and then the areal number density of particles on the surface of the prepreg is measured every 10° C. in a temperature range of 40 to 100° C., the areal number density of particles is 300/mm² or less at a temperature within a temperature range of 40 to 100° C.

12. The prepreg according to claim 2, wherein the thermoplastic resin in particle form comprises particles having a sphericity within a range of 90 to 100.

13. The prepreg according to claim 2, wherein the thermoplastic resin in particle form comprises particles in a total amount, wherein particles having a particle size of 1 μm or less comprise 1 vol % or less of the total amount of particles.

* * * * *